US005188901A

United States Patent [19]

Shimizu

[11] Patent Number: 5,188,901

[45] Date of Patent: Feb. 23, 1993

[54] ELECTROLUMINESCENT PANEL HAVING A FLUOROESIN LAYER

[75] Inventor: Yasumoto Shimizu, Tokyo, Japan

[73] Assignee: Hoya Corporation, Tokyo, Japan

[21] Appl. No.: 436,550

[22] Filed: Nov. 13, 1989

Related U.S. Application Data

[63] Continuation of Ser. No. 175,167, Mar. 30, 1988, abandoned.

[51] Int. Cl.[5] ............................ B32B 9/00; H01J 1/62

[52] U.S. Cl. .................................... 428/421; 313/509; 313/512; 428/690; 428/691; 428/917

[58] Field of Search ............... 428/690, 691, 917, 421; 313/509, 512

[56] References Cited

U.S. PATENT DOCUMENTS 4,491,620 1/1985 Joiner, Jr. .......................... 428/690
4,666,774 5/1987 Christini ............................ 428/690
4,708,914 11/1987 Kamijo ............................... 428/690

FOREIGN PATENT DOCUMENTS 882385 9/1971 Canada .

*Primary Examiner*—James Seidleck
*Attorney, Agent, or Firm*—Ladas & Parry

[57] ABSTRACT

In an electroluminescent panel comprising transparent and back electrode members opposite to each other and an electroluminescent laminate block between the transparent and the back electrode members, a fluororesin layer is coated on the electroluminescent laminate block together with the back electrode member so as to prevent invasion of moisture into the electroluminescent laminate block. The fluororesin layer has a thickness not thinner than 500 angstroms and may be formed by a fluororesin selected from a group consisting of polytetrafluoroethylene, polychlorofluoroethylene, polyvinylidene fluoride, and trifluoroethylene.

5 Claims, 1 Drawing Sheet

ELECTROLUMINESCENT PANEL HAVING A FLUOROESIN LAYER

This is a continuation of copending application(s) Ser. No. 07/175,167 filed on Mar. 30, 1988, now abandoned.

BACKGROUND OF THE INVENTION

This invention relates to an electroluminescent panel for use in terminal equipment and other display devices of an electronic computer system so as to display a static image, a moving picture, and the like.

As will later be described in detail, a conventional electroluminescent panel comprises a transparent insulator substrate, such as glass, a plurality of parallel transparent electrodes, a plurality of back electrodes extended at an agle with respect to the transparent electrodes, and an electroluminescent laminate block between the transparent and the back electrodes. Such an electroluminescent laminate block usually comprises an electroluminescent layer and at least one dielectric layer.

With this structure, the electroluminescent laminate block is subject to the influence of moisture when exposed to an atmosphere. Such moisture gives rise to dielectric breakdown of the dielectric layer when moisture invades the electroluminescent layer during exposure of the electroluminescent panel to the atmosphere. Such invasion of the moisture into the electroluminesent layer makes the life of the electroluminescent panel undesirably short.

In order to protect an electroluminescent panel from invasion of moisture, an electroluminescent panel has been proposed in Japanese Patent Publication No. Syô 58-55,634, namely, 55,634/1983. The proposed electroluminescent panel comprises a cover plate of glass which completely envelops the electroluminescent laminate block with an air gap left between the cover plate and the electroluminescent laminate block. A silicone oil fills the air gap to absorb moisture. As a result, the electroluminescent laminate block is hermetically sealed by the cover glass.

However, it is to be noted that water can not be completely removed from the silicone oil but inevitably remains as remnant water in the silicone oil. Accordingly, the remnant water invades the electroluminescent laminate block and brings about degradation of a characteristic of the electroluminescent panel.

In addition, the use of the cover plate and the silicone oil makes the electroluminescent panel intricate in structure and its manufacture complex.

SUMMARY OF THE INVENTION

It is an object of this invention to provide an electroluminescent panel which can favorably seal an electroluminescent layer and can therefore avoid invasion of moisture into the electroluminescent layer.

It is another object of this invention to provide an electroluminescent panel of the type described, which can prevent degradation of its characteristics.

It is still another object of this invention to provide an electroluminescent panel of the type described, which is simple in structure and light in weight.

It is yet another object of this invention to provide an electroluminescent panel of the type described, which is inexpensive.

It is another object of this invention to provide an electroluminescent panel of the type described, which is not eroded due to acid and alkali.

According to this invention, an electroluminescent is provided with comprises a transparent Insulative substrate having a principal surface, a transparent electrode member on the principal surface, a back electrode member opposite the transparent electrode member, an electroluminescent laminate block between the transparent electrode member and the back electrode member and which comprises an electroluminescent layer and at least one dielectric layer, and a fluororesin layer coated on the electroluminescent laminate block.

DETAILED DESCRIPTION OF THE PREFERRED EMBODIMENT

Figure 1:
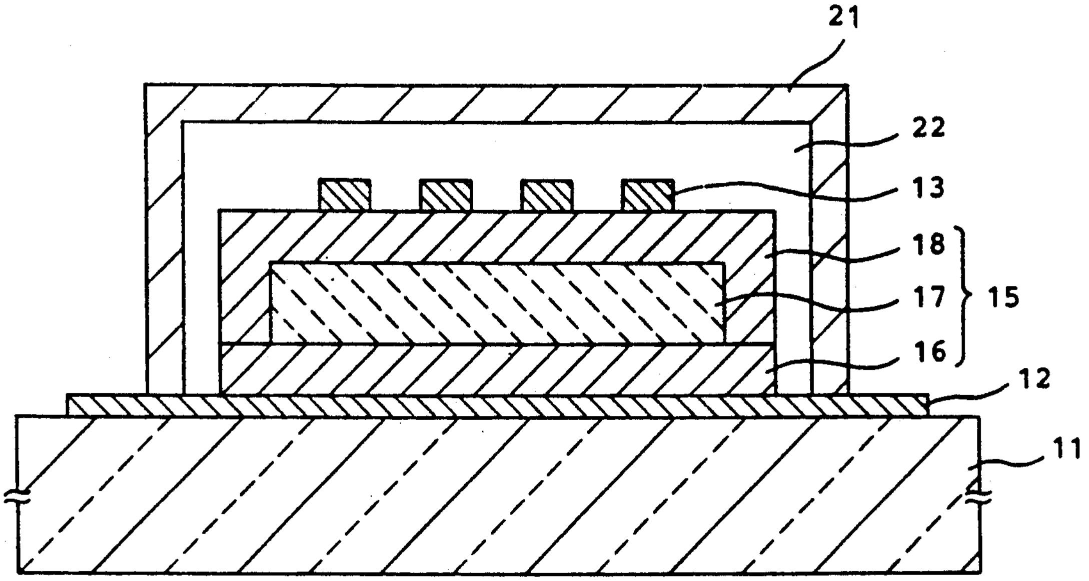
FIG. 1 PRIOR ART
FIG. 1 is a sectional view of a conventional electroluminescent panel.

Referring to FIG. 1, description will be given of a conventional electroluminescent panel for a better understanding of this invention. The illustrated electroluminescent panel comprises a transparent insulative substrate 11, such as glass, having a principal surface directed upwards in FIG. 1 and a transparent electrode member 12 of $In_2O_3$, $SnO_2$, or the like, coated on the principal surface. The transparent electrode member 12 is divided into a plurality of transparent electrodes arranged in parallel to one another from the righthand side of FIG. 1 to the lefthand side thereof. A back electrode member 13 is opposite to the transparent electrode member 12 and is also divided into a plurality of back electrodes which are arranged in parallel to one another and which intersect the transparent electrodes at cross points. The cross points provide picture elements, respectively, as well known in the art. The back electrode member 13 may be composed of Al, Ta, Mo, or the like.

An electroluminescent laminate block 15 is interposed between the transparent electrode member 12 and the back electrode member 13. The illustrated electroluminescent laminate block 15 comprises a first dielectric layer 16 of $Y_2O_3$, $Ta_2O_5$, or the like, an electroluminescent layer 17 of, for example, ZnS doped with an additive of Mn or the like, and a second dielectric layer 18 of $Y_2O_3$, $Ta_2O_5$, or the like. The electroluminescent layer 17 may comprise, by weight, 0.1 to 10.0% of the additive which acts as luminous centers.

With this structure, an a.c. voltage applied between the transparent electrodes and the back electrodes activates electrons from a base band to a conductive band and accelerates the electrons. When the accelerated electrons have sufficient energy, the luminous centers of Mn are excited by the accelerated electrons and are returned back to the base band. A light beam of yellowish orange is radiated when the electrons are returned back to the base band.

As mentioned in the background section of the instant specification, ambient moisture is liable to be invade the electroluminescent laminate block 15. More specifically, such moisture undesirably and locally reduces the resistance of the second dielectric layer 18 and even when very slight moisture is absorbed in the electroluminescent laminate block 15 through pin holes and the like. The local reduction of resistance in the electroluminescent laminate block 15 causes electric current to locally flow in excess through low resistance portions and to locally exceedingly heat the electroluminescent laminate block 15. Local heating of the electroluminescent laminate block 15 gives rise to separation of the second layer 18 and dielectric breakdown of the second dielectric layer 18 resulting in reduced life of the electroluminescent panel.

In addition, when the moisture reaches the electroluminescent layer 17, the life becomes seriously shortened because the electroluminescent layer 17 is extremely affected by moisture.

In the above-referenced Japanese Patent Publication, the electroluminescent laminate block 15, the back electrode member 13 and a portion of the transparent electrode member 12 are airtightly sealed by a glass cover 21 with a gap 22 left between the glass cover 21 and the electroluminescent laminate block 15. The gap 22 is filled with a silicone oil material which may be only silicone oil or mixture of a silicone oil and a silica gel powder. Although the silicone oil material has the property of absorbing the moisture, it is difficult to completely remove water from the silicone oil material, as mentioned before. Accordingly, the conventional electroluminescent panel has shortcomings as previously described in the background section of the instant specification.

Figure 2:
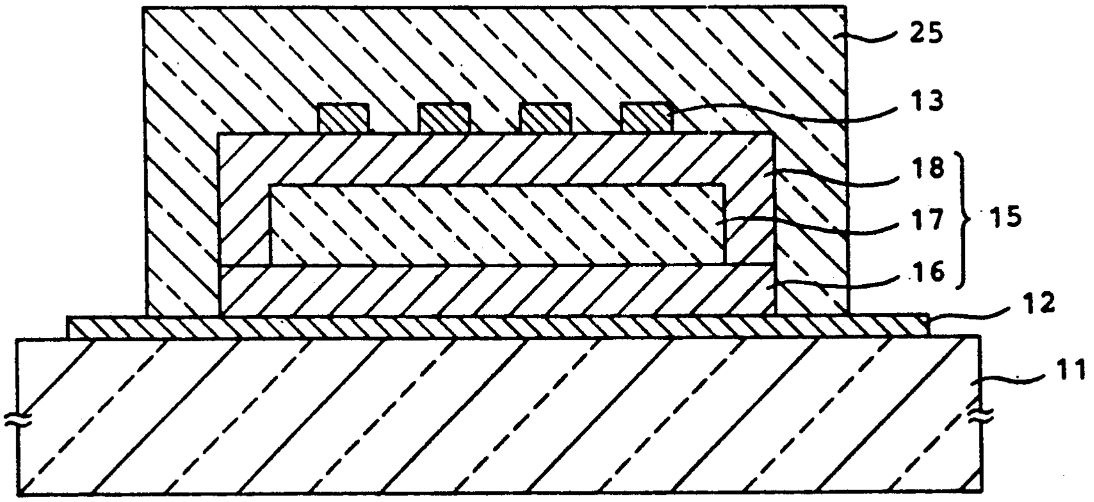
FIG. 2 is a similar view of an electroluminescent panel according to a preferred embodiment of this invention.

Referring to FIG. 2, an electroluminescent panel according to a preferred embodiment of this invention comprises similar parts designated by like reference numerals. In FIG. 2, the illustrated transparent substrate 11 is formed by aluminosilicate glass which may be, for example, NA40 manufactured and sold by HOYA Corporation. The transparent electrode member 12 is composed of a transparent conductive layer of, for example, indium-tin oxide. The exemplified indium tin oxide layer is deposited to a thickness of about 2000 angstroms by vacuum evaporation and is thereafter etched into the transparent electrodes by a photolithography technique by the use of an etchant of, for example, a mixed solution of hydrochloric acid and ferric chloride. At any rate, the transparent electrodes extend substantially parallel to one another on the transparent substrate 11 from the lefthand side in FIG. 2 to the righthand side.

On the transparent electrode member 12, the first dielectric layer 16 of $Ta_2O_5$ is deposited to a thickness of about 3000 angstroms by reactive sputtering. Practical reactive sputtering has been carried out by the use of a sputter target of tantalum in a chamber of a sputtering apparatus. In this event, the chamber has been filled with an argon gas which has been mixed with about 30% of oxygen and which has been kept at a partial pressure of $6\times10^{-1}$ Pa. Under the circumstances, electric power of about 9 watts/cm$^2$ has been applied to a pair of electrode plates one of which supports the target and the other of which supports the above-mentioned substrate 11.

Subsequently, the electroluminescent layer 17 is deposited on the first dielectric layer 16 to a thickness of about 6000 angstroms by vacuum evaporation. The vacuum evaporation is effected by the use of a sintered pellet of ZnS and Mn formed by adding to ZnS 0.5% of Mn by weight as an activation material. Thus, the sintered pellet serves as an evaporation source.

Furthermore, the second dielectric layer 18 of $Ta_2O_5$ is deposited on the electroluminescent layer 17 to a thickness of about 3000 angstroms by reactive sputtering in a manner similar to the deposition of the first dielectric layer 16.

Thereafter, an aluminum layer is formed on the second dielectric layer 18 by vacuum evaporation. The aluminum layer is about 3000 angstroms thick and is etched into a plurality of back electrodes 13 by the use of photolithography technique and an etchant which may be, for example, a mixed solution of nitric acid and phosphoric acid. As a result, the back electrodes extend perpendicularly to the sheet of FIG. 2 and perpendicularly intersect the transparent electrodes 12 as in the conventional electroluminescent panel. Thus, the electroluminescent laminate block 15 is between the transparent electrodes and the back electrodes. For brevity of description, a combination of the substrate 11, the transparent electrodes, the back electrodes, and the electroluminescent laminate block 15 will be called a panel block hereinafter.

After formation of the back electrodes, the panel block is introduced into a sputtering apparatus. The sputtering apparatus comprises a chamber defining a hollow space which is a high vacuum atmosphere of $10^{-6}$ Torr and which is kept at a temperature between 100° C. and 200° C. The panel block is heated in the above-mentioned atmosphere for a predetermined duration not shorter than one hour. Specifically, the heat treatment is carried out at a temperature of about 150° C. for two hours. After the heat treatment, a sputter target of fluororesin, namely, fluorine-contained polymer such as polytetrafluoroethylene, is introduced into the hollow space. Thereafter, the hollow space is filled with argon gas to a partial pressure of $6\times10^{-1}$ Pa. Under the circumstances, r.f. sputtering is carried out by supplying r.f. electric power of 2 watts/cm$^2$ to deposit a fluororesin layer 25 to a thickness of about 1 micron meter.

As a result, the fluororesin layer 25 is deposited on the panel block, namely, the laminate block 15 and the back electrode member 13 in the illusrated manner. Specifically, the fluororesin layer 25 covers the entire laminate block 15 without any intervening gap. This means that the fluororesin layer 25 is attached not only to an upper surface of the laminate block 15 and the back electrode member 13 but also to a side surface of the laminate block 15, as shown in FIG. 2. In addition, the fluororesin layer 25 is partially brought into contact with the transparent electrode member 12 at the lower end of the fluororesin layer 25. Thus, the laminate block 15 is completely enveloped by the fluororesin layer.

It has been found that the fluororesin layer 25 deposited in the above-mentioned manner can completely avoid invasion of moisture into the panel block. This is because the fluororesin layer 25 is dense enough and exhibits good adhesion to the luminescent laminate block 15 and the transparent substrate 11.

In order to confirm the above-mentioned fact, the electroluminescent panel has been subjected to a loading test which has been made by supplying the panel with electric power having a voltage of about 150 V and a frequency of 1 kHz. In this event, the electroluminescent panel has been held for about 500 hours in an atmosphere kept at relative humidity of about 80%. After a lapse of 500 hours, verification has been made so as to check whether or not picture elements have been deteriorated in the electroluminescent panel. Practically, it has been confirmed that none of the picture elements have been damaged or deteriorated and that the illustrated electroluminescent panel therefore had an extremely long life.

When the fluororesin layer 25 is too thin to prevent invasion of moisture, degradation takes place in the electroluminescent panel. In this situation, it is preferable that the thickness of the fluororesin layer 25 is not less than 500 angstroms.

While this inventin has thus far been described in conjunction with a preferred embodiment thereof, it will readily be possible for those skilled in the art to put this invention into practice in various other ways. For example, the transparent substrate 11 may be of quartz glass or multicomponent glass, such as soda-lime glass. The transparent electrode member 12 may be formed by $In_2O_3$, a mixture of $In_2O_3$ and W, $SnO_2$, or a mixture of $SnO_2$, Sb, and F. Each of the first and second dielectric layers 16 and 18 may be composed of an oxide selected from the group consisting of $Al_2O_3$, $SrTiO_3$, $BaTa_2O_6$, $Y_2O_3$, $HfO_2$, $Si_3N_4$, siliconoxynitride, and a composite material formed by a combination of the above-enumerated materials. The electroluminescent layer 17 comprises the matrix material selected from a group consisting of ZnSe, CaS, and SrS. Such a matrix material may be doped with an additive of a rare earth element selected from the group consisting of Eu, Sm, Tb, and Tm. Deposition of the electroluminescent layer 17 may be carried out by the use of sputtering, MOCVD (metal organic chemical vapor deposition), or the like. The back electrode member 25 may be a metal selected from the group consisting of Ta, Ni, NiAl, and NiCr. The transparent and the back electrode members 12 and 13 may be formed either by dry etching which uses CC14 or by masked evaporation. In addition, the fluororesin layer 25 may be composed of polychlorotrifluoroethylene, polyvinylidene fluoride, or trifluoroethylene. The fluororesin layer 25 may be deposited by vacuum evaporation. At any rate, the electroluminescent panel can prevent invasion of moisture into the electroluminescent laminate block and therefore has a long life. In addition, the fluororesin layer is brought into contact with the electroluminescent laminate block and the back electrode member without any gap. Accordingly, moisture proof material may not be arranged between the electroluminescent laminate block and the fluororesin layer. This means that the electroluminescent panel becomes light in weight. Moreover, the electroluminescent panel is inexpensive because the fluororesin layer is readily deposited in a conventional manner.

What is claimed is:

1. An electroluminescent panel comprising:

a transparent substrate of an insulative material having a principal surface;

a transparent electrode member on said principal surface;

a back electrode member opposite said transparent electrode member;

an electroluminescent laminate block between said transparent electrode member and said back electrode member and which comprises an electroluminescent layer and at least one diaelectric layer, said electroluminescent laminate block being on said transparent electrode member and said back electrode member being on said electroluminescent block, and a fluoresin layer coated on the entire extent of the exposed surface of said electroluminescent laminate block and said back electrode by sputtering, said electroluminescent block having lateral surfaces formed by said at least one dielectric layer, said fluororesin layer extending over said lateral surfaces of said dielectric layer to said transparent electrode.

2. An electroluminescent panel as claimed in claim 1, wherein:

said fluororesin layer has a thickness which is not thinner than 500 angstroms.

3. An electroluminescent panel as claimed in claim 1, wherein said fluororesin layer is formed by a fluororesin selected from the group consisting of polytetrafluoroethylene, polychlorofluoroethylene, polyvinylidene fluoride, and trifluoroethylene.

4. An electroluminescent panel as claimed in claim 1, wherein said sputtering is carried out by the use of a target of fluororesin.

5. An electroluminescent panel as claimed in claim 1, wherein said electroluminescent layer of the electroluminescent laminate block is interposed between first and second dielectric layers that are brought into contact with said transparent electrode member and said back electrode member, respectively.

* * * * *